3,290,180
Patented Dec. 6, 1966

3,290,180

METHOD OF TREATING SILICON AND DEVICES CONTAINING PN JUNCTIONS

Stephen S. Baird, Richardson, and Clyde R. Fuller, Plano, Tex., assignors to Texas Instruments Incorporated, Dallas, Tex., a corporation of Delaware No Drawing. Continuation of application Ser. No. 178,583, Mar. 9, 1962. This application Apr. 5, 1965, Ser. No. 445,767
6 Claims. (Cl. 148—1.5)

This is a continuation of our patent application, Serial No. 178,583, filed March 9, 1962 and now abandoned. This invention relates to a method of treating silicon to stabilize the electrical properties of silicon surfaces, and relates particularly to an improved method of cleaning and oxidizing the surfaces of silicon diodes and other silicon semiconductor devices containing PN junctions. The characteristics of semiconductor devices are, in part, dependent upon conditions existing at their surfaces. In junction type devices, the protection of the exposed portion of the rectifying barrier is especially important.

Cleaning the surfaces of the device is very desirable because clean surfaces enhance the result obtained from oxidation of the surfaces. Oxidation alone, however, is relatively ineffective in producing stable surfaces unless they are cleaned before oxidation. For example, any organic material remaining on a surface at the time oxidation takes place tends to short the device and cause discontinuities in the oxide.

The use of steam as an oxidizing medium provides several advantages over free oxygen. When steam is used, no inversion layer is formed on the N side because of the absence of free oxygen. With steam, the oxide grows much faster than with free oxygen. Possibly this occurs because of a difference in the oxidizing agent. Oxidation occurs at the silicon-silicon dioxide interface, and the oxidizing agent, possibly OH ions, provided by the steam are able to penetrate the oxide faster than oxygen can and thus react at a faster rate. After the steam oxidation, the silicon devices are cooled in helium, thus avoiding free oxygen in the entire process.

An object of the present invention is to provide a method for protecting the junction of silicon diodes.

Another object is to provide a method of surface cleaning and oxidizing silicon diodes that will reduce the leakage current and only slightly reduce the breakdown voltage.

A further object of the invention is the use of sulfuric acid along with other cleaning agents to clean the surfaces of a diode preparatory to oxidation.

Other objects, features and advantages will be apparent from the following detailed description, taken in connection with the appended claims.

A number of variations and advantages in the cleaning process may be devised, but the preferred process herein after described most advantageously utilizes the cleaning and surface treatment required in the pre-oxidation process.

The silicon diodes, comprised of mesa etched slices, are degreased in a soxhlet containing trichloroethylene, xylene or some other suitable solvent for thirty minutes. The solvent is then removed by rinsing the slices in methyl alcohol and thereafter rinsing them in water. To insure the complete removal of all organic material from the surface of each slice, the slices are subsequently boiled in nitric acid for twenty minutes at 100° C. and afterwards rinsed in running deionized water for about five minutes. Surface treatment is finally accomplished by immersing the slices for about twenty minutes in concentrated sulfuric acid, heated to 200° C. Most of the sulfate which remains on the surface from the action of sulfuric acid is then removed by rinsing the slices for five minutes in running deionized water.

As above indicated, the water rinse does not completely remove all traces of the sulfate from the silicon wafer. Removal of the remainder is necessary as it would contaminate the surface and increase the oxygen absorption at the surface. Moreover, oxygen, being a P-type dopant, will tend to cause an inversion layer at the surface of the wafer, while the oxygen and the sulfate degrade the reverse characteristics of a silicon diode. Oxygen, principally, seems to contribute to high leakage while the sulfate tends to reduce the breakdown voltage. Results have shown that the use of a method which eliminates the presence of sulfate and free oxygen before and during oxidation and cooling of silicon diodes markedly reduces leakage and only slightly reduces breakdown voltage.

The remaining sulfate is removed from the slices in the following manner: The slices are first soaked in hydrofluoric acid for thirty minutes. The acid that remains on the surfaces of the slices is then removed by rinsing the slices in water for about five minutes, then boiling them in deionized water twice for about fifteen minutes each, then rinsing them in water for about five minutes, then boiling them in nitric acid for about thirty minutes, and finally rinsing them in running deionized water for about thirty minutes.

The wet slices, now ready for oxidation, are placed in quartz boats, loaded into the oxidation furnace under steam and oxidized for about five and one-half hours at atmospheric pressure. When oxidation is completed, steam is replaced by an inert gas such as helium, the slices are dried therein for about one hour at the oxidation temperature of 1200° C. and then cooled to room temperature under helium.

By the practice of this invention the tendency of silicon to absorb oxygen is reduced, and during the oxidation of the silicon with steam free oxygen is avoided. This results in minimizing the breakdown voltage degradation and lowering the leakage of the oxide protected junction. The oxide film coating the slice is approximately 20,000 Angstroms thick.

An example illustrating the improvement in leakage current and breakdown voltage by the practice of the invention is shown in Table I, in which results are compared when either oxygen or sulfate or both are allowed to come into contact with the slices, or remain on the slices during the operation of the method.

TABLE I

| | Reverse Current at $V_z$=50 v. | | Breakdown Voltage | |
|---|---|---|---|---|
| | Before | After | Before | After |
| $SO_4$ and $O_2$ | .25 | .0090 | 375 | 50 |
| $SO_4$ only | 1.20 | .0033 | 275 | 110 |
| $O_2$ only | .29 | 2.4 | 360 | 275 |
| $SO_4$ and $O_2$ both excluded | 1.2 | .0070 | 375 | 360 |

It is to be understood that while the method of the invention has been described with reference to specific cleaning solutions and the length of time of their use, variations may be resorted to without departing from the spirit and scope of the invention as defined by the appended claims.

What is claimed is:

1. The method of preparing a protected silicon PN junction which comprises the steps of degreasing the silicon slice in trichloroethylene, rinsing it in methyl alcohol and water, boiling it for 20 minutes at 100° C. in nitric acid, rinsing it in deionized water for 5 minutes, heating it in concentrated sulfuric acid at 200° C. for 20 minutes and rinsing in deionized running water for 5 minutes, soaking in hydrofluoric acid for 30 minutes and rinsing in water 5 minutes, boiling in deionized water twice for 15 minutes and rinsing in water 5 minutes, boiling in nitric acid 30 minutes and rinsing in deionized running water for 30 minutes, oxidizing about five and one-half hours in steam at atmospheric pressure at 1200° C., drying in helium for one hour and cooling to room temperature.

2. The method as described in claim 1 wherein an oxide layer having a thickness of approximately 20,000 Angstroms is formed.

3. The method of improving the breakdown voltage and reverse current characteristics of a silicon PN junction diode, comprising the steps of:

(a) cleaning the silicon slice in trichloroethylene;
(b) rinsing the slice in methyl alcohol and then in boiling water;
(c) treating the slice with concentrated sulfuric acid and then rinsing it in running water;
(d) soaking the slice in hydrofluoric acid and then rinsing it in water;
(e) boiling the slice in deionized water and then in nitric acid;
(f) rinsing the slice in water;
(g) oxidizing the slice in steam at about 1200° C.; and
(h) drying and cooling the slice in helium.

4. The method of preparing a protected silicon PN junction which comprises the steps of degreasing the silicon slice in trichloroethylene, rinsing it in methyl alcohol and water, boiling it for 20 minutes at 100° C. in nitric acid, rinsing it in deionized water for 5 minutes, heating it in concentrated sulfuric acid at 200° C. for 20 minutes and rinsing in deionized running water for 5 minutes, soaking in hydrofluoric acid for 30 minutes and rinsing in water 5 minutes, boiling in deionized water twice for 15 minutes and rinsing in water 5 minutes, boiling in nitric acid 30 minutes and rinsing in deionized running water for 30 minutes, oxidizing about five and one-half hours in steam at atmospheric pressure at 1200° C., and drying in an inert atmosphere for one hour.

5. The method of improving the breakdown voltage and reverse current characteristics of a silicon PN junction diode, comprising the steps of:

(a) cleaning the silicon slice in trichloroethylene;
(b) rinsing the slice in methyl alcohol and then in boiling water;
(c) treating the slice with concentrated sulfuric acid and then rinsing it in running water;
(d) soaking the slice in hydrofluoric acid and then rinsing it in water;
(e) boiling the slice in deionized water and then in nitric acid;
(f) rinsing the slice in water;
(g) oxidizing the slice in steam at about 1200° C.; and
(h) drying and cooling the slice in an inert gas.

6. In a method of treating a semiconductor device of the type comprising a semiconductor wafer having a P-N junction therein, such treatment being for the purpose of improving the breakdown voltage and reverse current characteristics of the P-N junction, the steps of:

(a) exposing the surfaces of the wafer to sulfuric acid;
(b) forming a coating of silicon oxide on the surface of the wafer; and
(c) then cooling in an inert gas.

No references cited.

ALFRED L. LEAVITT, *Primary Examiner.*
W. L. JARVIS, *Examiner.*